United States Patent [19]
Krakowski

[11] 3,789,459
[45] Feb. 5, 1974

[54] METHOD AND APPARATUS FOR INCREASING PORTION YIELD FROM INDUSTRY STANDARD FROZEN FISH BLOCKS

[75] Inventor: John F. Krakowski, Waltham, Mass.
[73] Assignee: Methods, Inc., Smyrna, Del.
[22] Filed: Oct. 31, 1972
[21] Appl. No.: 302,596

[52] U.S. Cl.............................. 17/52, 17/54, 17/45
[51] Int. Cl............................................ A22c 25/18
[58] Field of Search ...................... 17/32, 45, 52, 54

[56] References Cited
UNITED STATES PATENTS
| | | | |
|---|---|---|---|
| 3,101,761 | 8/1963 | Buehler et al. | 17/32 X |
| 3,433,647 | 3/1969 | Johnston | 17/32 X |
| 2,912,924 | 11/1959 | Dahl | 17/32 X |

*Primary Examiner*—Antonio F. Guida
*Assistant Examiner*—D. L. Weinhold
*Attorney, Agent, or Firm*—B. P. Fishburne, Jr.

[57] ABSTRACT

Industry standard size and weight frozen fish blocks, usually slightly overweight, are conveyed over an automatic weigher which will record the excess weight in each block over that weight needed to produce the required number of portions from the block. As successive blocks pass over the weigher, each will have its overweight added, or its underweight subtracted, with reference to the weight necessary to produce the required number of portions. When the automatic weigher records from a number of blocks an accumulated overweight equal to the weight of one strip taken from a block to produce a given number of portions, an automatic diverting means associated with the weigher will divert one block to a stripping saw which will produce from that block one extra strip in comparison to a second saw which receives and processes all other blocks in the procession crossing the automatic weigher.

8 Claims, 4 Drawing Figures

Patented Feb. 5, 1974 3,789,459
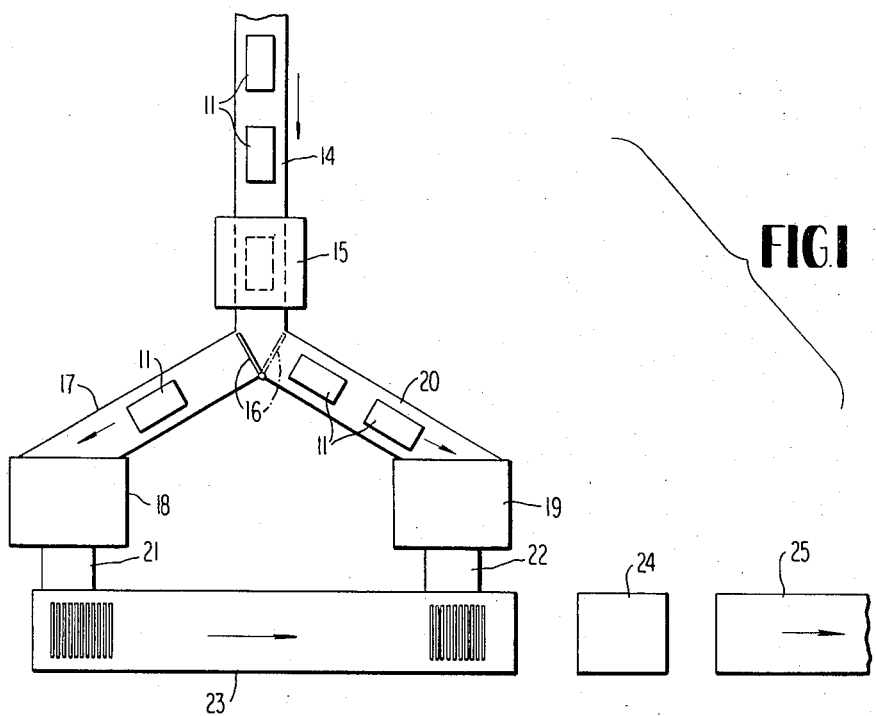
FIG.1
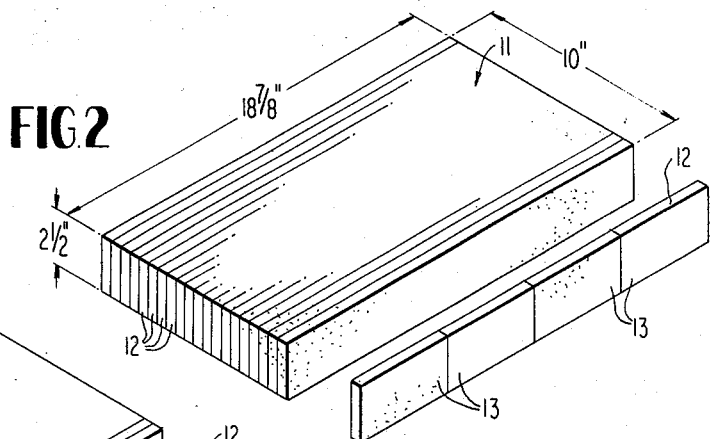
FIG.2
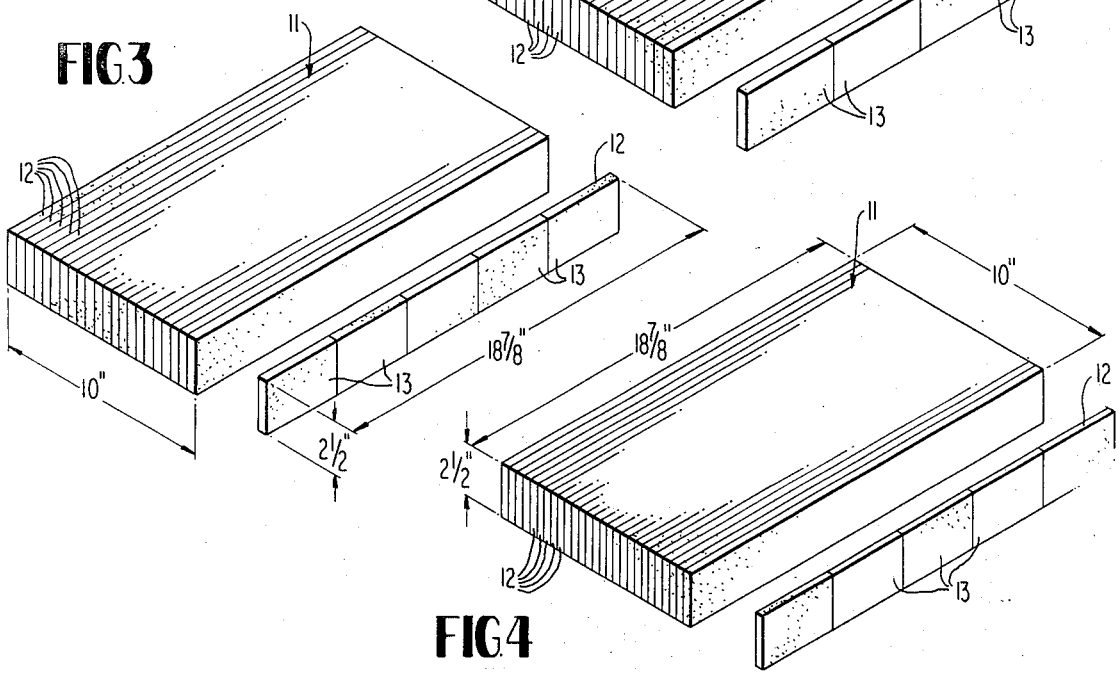
FIG.3
FIG.4

METHOD AND APPARATUS FOR INCREASING PORTION YIELD FROM INDUSTRY STANDARD FROZEN FISH BLOCKS

BACKGROUND OF THE INVENTION

The frozen fish portion control industry has a number of industry standards and requirements which make it very difficult for procedures to be altered and efficiencies and economies to be effected without causing confusion or even chaos. Among the built-in industry standards which cannot be deviated from conveniently is a rectangular frozen fish block measuring approximately 18⅞" × 10" × 2½" and weighing approximately 16½ lbs. Traditionally in the industry the suppliers of these frozen blocks furnish them a few ounces overweight to assure meeting their own inspection weight standards and only rarely are the blocks exactly 16½ lbs, or underweight. In addition to this industry standard frozen block, there are other strict standards pertaining to the weight and dimensions of individual finished portions and also relating to the dimensions of buns employed with the portions to make fish sandwiches and the packages in which the finished portions are shipped to users. For example, the industry has established weights for finished frozen fish portions before and after battering and breading and has established dimensions for the finished portions. 4 oz., 3 oz. and 2.4 oz. finished portions have been adopted and the rectangular 4 oz. portions are required to be 4¾" long × 2½" (the thickness of the original block) by approximately 7/16" thick. When it is understood that this industry is producing frozen packaged standard portions numbering in the hundreds of millions annually and that expensive equipment for use by the various processors, wholesalers and retailers has been devised over a period of years, then it will be clear as to why it is so difficult for the industry to achieve improvements and economies without seriously upsetting established procedures.

Another important reason why it is so difficult to achieve any change in this industry is the existence of strict U.S. Department of Commerce inspection standards as to weight and percentage of fish content in the finished portions. Because of these restrictions, the industry has been unable to effect, among other things, an increase in the portion yield from the industry standard 16½ pound frozen fish blocks, although it is known that the blocks vary in weight and are generally overweight. The practice has been simply to give away this overage to the retailer and ultimate consumer because there has been no apparent way to increase the portion yield without deviating from or upsetting one or more of the strict industry standards. It should be noted at this point that, if it were possible to increase the portion yield from a standard block by only one or two per cent, this would represent a huge economic saving in the course of a year based on the industry volume.

With the above background in mind, the objective of this invention is to provide a method whereby the portion of yield of the industry may be significantly increased without violating or materially departing from the recognized industry standards, procedures and inspection requirements, and more importantly, without the necessity for increasing the fish flesh content of the basic frozen block from which the finished portions are produced by an established stripping and cross-cutting procedure with conventional sawing equipment. In other words, by means of the invention, the portion yield from the identical industry standard frozen fish block customarily used may be significantly increased to the economic benefit of the entire industry and without violating U.S.D.C. inspection requirements and without detriment to the ultimate consumer in terms of the size, quality and weight content of the finished portion.

The increased portion yield achieved by the invention is made possible by a simple automatic weight recording procedure which recognizes and records the amount of overweight in the frozen fish blocks in reference to a predetermined net weight per block needed to produce a given number of portions per block. When the weigher totalizes an accumulated overweight from a number of blocks equal to the weight of one strip from which several portions are cross-cut, then one block will be diverted to a stripping saw which is capable of cutting one extra strip from that particular block, in comparison to one less strip cut from all of the other blocks which are conveyed to a standard stripping saw producing a standard number of strips from a block. Subsequently, all of the strips produced by both stripping saws are cross-cut into equally sized portions and the portions originating from the strips produced by the two stripping saws are thoroughly mixed prior to further processing and packaging. By this procedure, all inspection requirements in terms of weight and fish flesh content can be met and the ultimate consumer can detect no difference in the end product, although an occasional portion is minutely thinner than most of the portions produced by the method. After battering and breading, there is no way as a practical matter for the consumer or anyone else to detect a physical difference in the portions originating from the blocks which were diverted to the saw producing an extra strip from the remaining portions originating from the blocks which were stripped by the standard saw.

Thus it may be seen that the invention allows the full utilization of accumulated overweight in the basic industry standard frozen fish blocks which is ordinarily ignored and passed on to the customer with the resulting economic loss. The invention makes it feasible to eliminate this loss and turn it into an increased profit without harm to the customer and without deviating from the noted industry standards and procedures including inspection procedures.

An additional benefit derived from the invention is that the human element and human error is eliminated from the inspection procedure and a constant check on the total product being produced is rendered feasible, in contrast to the usual spot check by inspectors in which less than 1/10 of a per cent of the total product is actually inspected.

Other objects and advantages of the invention will become apparent during the course of the following detailed description.

BRIEF DESCRIPTION OF DRAWINGS

FIG. 1 is a diagrammatic plan view of a conveyor system for frozen fish blocks and strips produced from such blocks by stripping saws in according with the invention.

FIGS. 2, 3 and 4 are partly diagrammatic views in perspective of frozen blocks and strips cut from such blocks and portions cross-cut from each strip.

DETAILED DESCRIPTION

Prior to describing the actual method embodying the invention in connection with FIG. 1, reference is made to FIGS. 2, 3 and 4 which show an industry standard frozen fish block 11 having a declared weight of 16½ pounds, a length of 18⅞", a width of 10" and a thickness of 2½". FIG. 2 illustrates how the standard block 11 may be cut by means of a conventional stripping saw into twenty strips, each approximately 15/32 inch thick along the longitudinal dimension. These strips are designated by the numeral 12 in the drawings. The drawings also illustrate how each elongated strip 12 is subsequently cross-cut into a plurality of equally sized individual rectangular portions 13. With reference to FIG. 2, each strip 12 is cross-cut into four portions each approximately 4¾ inches long. In FIG. 3, where the basic block 11 is initially cut to form 22 of the strips 12, ech approximately 7/16 inch thick, instead of 20, each strip is then cross-cut into five equally sized portions 13. FIG. 4 shows the block 11 divided into 27 of the strips 12, each approximately ⅜ inch thick, and each strip subdivided or cross-cut into five of the portions 13, each appoximately 3¾ inches long.

In addition to the showing of FIGS. 2, 3 and 4 relating to the stripping of the standard block 11 and subsequent cross-cutting of strips into individual portions, the following Chart A on a separate sheet herein discloses statistics relative to some raw breaded portions produced from one of the blocks 11 with a declared weight of 16½ pounds. This chart also contains some explanatory notes helpful in understanding the factors on which the actual method is based.

Referring to Chart A for raw breaded 4 ounce regular portions, the United States Department of Commerce (U.S.D.C.) regulations require a 75 per cent fish flesh content for each portion, or 3 ounces of fish flesh and 1 ounce of batter and breading. This is the requirement for a so-called Grade A standard. In today's industry, each 16½ pound frozen block 11 which is cut into 4 ounce raw breaded portions produces 80 equally sized portions. To meet U.S.D.C. Grade A fish flesh content standards, 240 ounces must be fish flesh per 80 portions produced (80 × 3 ozs. − 240 ozs.). In other words, a block 11 which would weigh 252.4 ounces will produce the same number of portions (80 portions) and will still meet U.S.D.C. Grade A standards. Referring to Chart A, column 5, ounces of sawdust waste 12.4 ozs. + (80 × 3 ozs.) = 252.4.

It should now be evident that by producing 4 ounce regular raw breaded portions from a 16½ pound block 11, the processor is losing approximately 11 ounces per block. The block weighs 264 ounces (Chart A), less 240 ounces to meet U.S. Department of Commerce fish flesh content requirements, less sawdust waste of 12.4 ounces (Chart A), leaves 11.6 ounces. Similar reasoning and calculations are applicable to the other raw breaded portion sizes noted in column 1 of Chart A.

It is also desirable, in order to fully appreciate the benefits of the invention, to first understand the procedures followed by the U.S.D.C. inspectors under present day practice. In determining the percentage of fish flesh, raw fish portions are taken at random before any further processing of the same and these portions are weighed. If a processor is producing 4 ounce portions, the finished portion is assumed to weigh 4 ounces regardless of the actual weight. To guard against underweight packages, the processor check weighs every package, and this check weighing process is also performed by the U.S.D.C. inspector.

The inspector is determining fish flesh content takes one package of raw breaded portions with a declared weight of one pound, containing 4 finished portions.

CHART A

| 1 | 2 | 3 | 4 | 5 | 6 | 7 | 8 | 9 | 10 |
|---|---|---|---|---|---|---|---|---|---|
| Wgt. of finished portion in ounces | Wgt. of portion before batter and breading (see note 1) (oz) | Ounces per 16½# block | Percent of sawdust waste from cutting | Ounces of sawdust waste (see note 5) (oz) | Ounces per block into raw portion (see note 2) | Number of raw portion per block (see note 3) | Cutting diagram industry today | Number of portions per cutting diagram (see note 4) | Percent of gain (loss) using method |
| 4 oz. reg. | 3 | 264 | 4.51 | 12.4 | 251.6 | 83.83 | See Fig. 2... | 80.0 | 4.78 |
| 3 oz. | 2.25 | 264 | 5.17 | 13.7 | 250.3 | 111.2 | See Fig. 3... | 110 | 1.09 |
| 2.4 oz. | 1.8 | 264 | 6.49 | 17.1 | 246.9 | 137.1 | See Fig. 4... | 135 | 1.55 |

Note 1 — To determine weight of portion before batter and breading, multiply weight of finished portion by 75% (USDC Grade A standard for raw breaded portion).
Note 2 — Ounces per block less ounces of sawdust waste from cutting.
Note 3 — Ounces per block into raw portions (column 6) ÷ weight of portion before batter and breading (column 2).
Note 4 — The industry has established a 4¾" long portion for 4 oz. regular portion and 3¾" long portion for 3 oz. and 2.4 oz. portions. Since these dimensions can only be taken from the 18⅞" dimension of the block, this will regulate the number of cross-cuts. (See cutting diagrams, Figures 2, 3 and 4). To calculate number of portions, multiply number of strips by number of cross-cuts as shown in Figures 2, 3 and 4.
Note 5 — The most commonly used blade for cutting is .014" thick with a .022" kerf.

The weight of each raw fish portion, before battering and breading is 3 ounces and the assumed finished weight of the portion is 4 ounces. Therefore, 3 ounces divided by 4 ounces equals 75 per cent fish flesh which meets U.S.D.C. Grade A specification requirement. The U.S.D.C. inspector will use this same procedure several times and the results of the several samplings are averaged for the particular run. Therefore, it is possible for the fish flesh content of one test sample to fall below Grade A requirements, provided another is high enough to raise the average sufficiently to meet the specification.

Referring to FIG. 1 which depicts the actual method embodying the invention, a conveyor 14 is provided for the movement of a multiplicity of the industry standard frozen fish blocks 11, each having a declared weight of 16½ pounds and being dimensioned as illustrated in FIGS. 2-4. As previously noted, in most instances, the blocks will be overweight by a few ounces. The conveyor 14 transports the blocks 11 in a succession over an automatic weigher 15 of a known type which can measure and record overweight and underweight in relation to an actual weight figure which is programmed into the weigher. In other words, the automatic weigher 15, which is a conventional mechanism available on the market, can be preset to measure and record for each frozen block 11 any amount of overweight or underweight from a predetermined actual weight for the block necessary to produce a given number of substantially identical portions. The weigher has the additional ability, as succeeding blocks 11 pass over it, to add up accumulated overweight present in a number of blocks and to subtract any underweight which might occasionally occur in a block.

Therefore, the blocks 11 are conveyed over the automatic weigher 15 in succession, which weigher will record the amount of excess weight in each block not needed to be utilized in the subsequent production from that block of a given number of individual portions 13. Referring to Chart A, in the case of a 4 ounce regular raw breaded portion, the weigher 15 is set to record the number of ounces in one block 11 above the weight needed to produce 80 portions having the dimensions specified under "Note 4" of Chart A, or approximately 11 ounces in this instance. Since each strip 12, FIG. 2, for this particular product is cross-cut into four equal portions, each strip must weigh appoximately 12.05 ounces (3 ozs. × 4 portions = 12 ozs. + 0.05 ozs.). The 0.05 ounce factor represents the weight of sawdust produced from cross-cutting of the strip 12. As soon as The weigher 15 records an accumulated overweight of 12.05 ounces, an automatic diverter device 16 operatively connected with the weigher will divert one block 11 onto a branch conveyor 17 leading to a stripping saw 18 which will cut one extra strip 12 from that particular block in comparison to the number of strips 12 cut by a companion stripping saw 19 which receives all of the other blocks 11 on a conveyor branch 20.

Since the weigher 15 has the ability to add up the accumulated overweight of the blocks 11 and subtract any underweight present in the same, the following may take place. If a given block 11 is 2 ounces overweight from the norm of column 3, Chart A, or weights 226 ounces, the weigher will record approximately 13 ounces. If the block in question were 2 ounces underweight or 262 ounces in weight, the weigher would record approximately 9 ounces with reference to the 11 ounce factor previously explained.

Again referring to FIG. 1, the total number of strips produced by the two stripping saws 18 and 19 will be moved by conveyors 21 and 22 onto a preferably right angular conveyor 23 which carries all of the strips to a conventional cross-cutting saw 24 which cuts every strip 12 transversely to produce the portions 13. From the cross-cutting saw 24, the portions 13 are delivered to another conveyor 25 which carries them to further processing stations for battering, breading and packaging. A further important feature of the method resides in the intermixing on the conveyor 23 of the two slightly different forms of strips 12 produced by the saws 18 and 19, it being understood that the saw 18 set to produce one extra strip is turning out strips which are minutely thinner and slightly underweight in comparison to the strips coming from the saw means 19. It is therefore necessary that the two types of strips be intermixed and comingled thoroughly prior to packaging a number of the portions 13 in a container so that the weight of the portions in the package will average out to meet U.S.D.C. weight requirements. The physical arrangement of conveyor 23 at right angles to the two infeed conveyors 21 and 22 results automatically in the intermixing of the two slightly different forms of strips 12 prior to those strips reaching the cross-cutting saw 24. If necessary, additional automatic mixing equipment may be employed or manual mixing of strips on the conveyor 23 could be resorted to.

It is desired to emphasize here that all of the individual equipment components diagrammatically shown in FIG. 1 are per se conventional and well known in the industry in question, and therefore a more detailed illustration and description of such items as the weigher 15 and the stripping and cross-cutting saw means is not required herein for a full understanding of the invention. The true essence of the method invention is embodied in the manner in which these equipment components are employed together in the system above described and shown in FIG. 1 to enable economic and profitable utilization of excess material in the blocks 11 which is customarily disregarded and given away by the processors at an economic loss. Therefore, while the individual equipment components are per se conventional, certainly their arrangement as shown in FIG. 1 and their operation in the practice of the method is completely novel and unique.

In addition to the substantial economic benefits of the invention above-described, the invention materially simplifies and improves the uniformity of inspection procedures and eliminates human error and personal judgment of the inspector. In accordance with the invention, the U.S.D.C. inspector will check the per cent fish flesh content by simply checking the weigher 15 and counting the number of strips 12 being produced by each stripping saw 18 and 19. This simplified procedure will enable the industry and the Government a practical and uniform way of checking the fish flesh content of actual production, such as one-tenth of 1 per cent under existing procedures. Furthermore, the ultimate consumer will be assured of receiving a more uniform product.

While the invention has been described throughout in connection with an industry standard 16½ pound frozen fish block, it should be maue clear that standard frozen blocks of somewhat different weights are known in the industry including 13½ pound and 18½ pound blocks with slightly different dimensions from those specified for the 16½ pound standard block. The invention is equally appicable to any of these standard block sizes including others which might be produced in the future.

In connection with the data in Chart A, particularly columns 4 and 5 of this chart relating to sawdust waste, these particular figures are based on the use of a standard saw blade having a thickness of 0.014 inch with a kerf or 0.022 inch. Should a blade be developed or used with a smaller kerf, this will cause a revision of the data in Chart A relating to sawdust, but in any event, the essential features and principles of the invention will be unchanged.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method for increasing the portion yield from industry standard frozen rectangular fish blocks having declared uniform dimensions and weights with a tendency for the blocks to be slightly overweight, comprising the steps of transporting a plurality of said blocks in succession to a weighing station and weighing each block and recording the degree of overweight or underweight for each block in relation to a known weight for the block required to produce therefrom a predetermined number of substantially identical protions produced by cutting the block first into plural elongate strips and then cross-cutting the strips into plural individual portions, continuing the procedure until an accumulated overweight from a number of the blocks equals the weight of one extra strip and then immediately diverting one block from the procession of blocks onto a different transporting path from all of the other blocks, cutting the diverted block into a plurality of said elongate strips and including one extra strip, cutting all of the other blocks on the other transporting path into a regular number of strips, said regular number being one less than the number produced from the diverted block, intermixing all of the strips produced from all of the blocks and transporting them all to a cross-cutting station and then cross-cutting all of the strips into individual portions.

2. A method for increasing the portion yield from an industry standard frozen rectangular fish block, comprising the steps of transporting a procession of the blocks to a weighing station and weighing each block at said station and noting any overweight or underweight condition of each block in relation to a standard, continuing the procedure until an accumulated overweight from a number of the blocks equals the weight of a customary strip cut from blocks in the processing of portions and then immediately diverting one block from the procession to a separated transporting path from the transporting path along which all of the other blocks are moved, moving all of the other blocks to a stripping saw station and sawing all of the other blocks into a normal number of strips per block of equal size, and moving said diverted one block on said separated transporting path to another stripping saw station and at such station sawing said one block into a plurality of equal size strips including one more strip than said normal number produced at the first-named stripping saw station.

3. Apparatus for increasing the portion yeild from industry standard frozen rectangular fish blocks having declared uniform dimensions and weights with a tendency for the blocks to be slightly overweight comprising means for conveying a plurality of said blocks in succession to a weighing station, automatic weigher means at the weighing station to weigh each block and to record its overweight or underweight factor with reference to a known weight for the block required to produce therefrom a predetermined number of substantially identical portions produced by first cutting the block into plural elongate strips and then cross-cutting the strips into plural individual portions, said automatic weigher means also adding the overweight factor of each succeeding block and substracting any underweight factor until an accumulated overweight factor for a plurality of the blocks is recorded equal to the weight of one extra strip, diverter means responding to the recording of said accumulated overweight factor to divert one block from the procession of blocks onto a conveyor branch which is separated from the portion of the conveyor means transporting all of the other blocks beyond the weighing station, a pair of separate block stripping means, one such means acting on each diverted block and forming the same into plural equally sized strips including one extra strip, the other strippng means acting upon all of the other blocks in succession to form each of them into a regular predetermined number of strips and said number for each block being one less than the number of strips produced from each diverted block, additional conveyor means transporting all of the strips produced by the pair of stripping means toward a portion forming station including means to intermix the strips produced from diverted blocks with strips produced from all of the other blocks, and means at said portion forming station to cross-cut all strips into individual portions.

4. Apparatus for increasing the portion yield from industry standard size frozen fish blocks comprising conveyor means for transporting a procession of the blocks to a weighing station, an automatic weigher at the weighing station to weigh each block in succession and record its overweight or underweight and to record accumulated overweight for a number of the blocks as they pass over the automatic weigher, diverter means adjacent to the automatic weigher and responding to a predetermined accumulated overweight recorded by the automatic weigher to divert a single block from said procession, separated conveyor means leading from the weighing station including two conveyor branches, one branch transporting each single diverted block and the other branch transporting all of the other blocks beyond the weighing station, a first stripping saw means receiving the other blocks on their conveyor branch and dividing each such block into a normal number of equal size strips to be subsequently cross-cut into individual portions, and a second stripping saw means receiving the diverted blocks on their conveyor branch and dividing each such block into a plurality of equal size strips including one more strip than the normal number produced by the first stripping saw means.

5. The apparatus as defined by claim 4, and an additional conveyor means receiving all of the strips produced by the first and second stripping saw means and carrying them to a portion producing station, and a strip cross-cutting means at the portion producing station dividing each strip into plural equal size portions.

6. The method as defined by claim 2, and the additional steps of transporting all of the strips from both stripping saw stations to a cross-cutting station and at the cross-cutting station cutting each strip into a plurality of individual portions of a substantially equal size.

7. The method as defined by claim 6, wherein each industry standard frozen rectangular fish block is elongated and has a width considerably exceeding the thickness of the block and being considerably less than the length of the block, each strip produced at each stripping saw station comprising a thin elongated rectangular cross setion strip taken from the full length of the block, and subsequently cross-cutting each strip into a plurality of equal length rectangular slab-like individual portions being the same thickness as the strip from which they are cut.

8. A method for increasing the portion yield from a frozen mass of fish flesh of predetermined size, comprising the steps of transporting a plurality of said frozen masses of fish flesh to a weighing station and weighing each frozen mass at said station and detecting and recording any overweight or underweight of each mass in relation to a standard, continuing to procedure and recording accumulated overweight for a number of said masses until a predetermined overweight factor is recorded and then diverting one of said masses along a separated transporting path while continuing to move all of the other masses on another transporting path, dividing each diverted mass into plural equal size sections including one more section than a normal number produced from each of the other masses, and dividing each of the other masses into said normal number of equal size sections, and then commingling all divided sections prior to further dividing them into individual portions and packaging.

* * * * *